United States Patent
Zhang et al.

(10) Patent No.: US 9,729,230 B2
(45) Date of Patent: Aug. 8, 2017

(54) CENTRALIZED AUTOMATIC BIAS CONTROL SYSTEM AND METHOD FOR MULTIPLE OPTICAL MODULATORS

(71) Applicant: NEC Laboratories America, Inc., Princeton, NJ (US)

(72) Inventors: Shaoliang Zhang, Princeton, NJ (US); Fatih Yaman, Monmouth Junction, NJ (US); Yue-Kai Huang, Princeton, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 122 days.

(21) Appl. No.: 14/808,414

(22) Filed: Jul. 24, 2015

(65) Prior Publication Data

US 2016/0028475 A1    Jan. 28, 2016

Related U.S. Application Data

(60) Provisional application No. 62/028,852, filed on Jul. 25, 2014.

(51) Int. Cl.
*H04B 17/00* (2015.01)
*H04B 10/077* (2013.01)
(Continued)

(52) U.S. Cl.
CPC ....... *H04B 10/0775* (2013.01); *G02F 1/0123* (2013.01); *H04B 10/564* (2013.01)

(58) Field of Classification Search
CPC .. H04B 10/0775; H04B 10/564; G02F 1/0123
(Continued)

(56) References Cited

U.S. PATENT DOCUMENTS 6,271,945 B1 *  8/2001  Terahara .............. H04B 10/505
                                                    398/26
7,848,369 B1 * 12/2010  Bostak .................. G02F 1/0121
                                                    359/237

(Continued)

OTHER PUBLICATIONS

Cho, et al., "Closed-Loop Bias Control of Optical Quadrature Modulator", IEEE Photonics Technology Letters, vol. 18, No. 21, pp. 2209-2211, Nov. 2006.

(Continued)

*Primary Examiner* — Juan A Torres
(74) *Attorney, Agent, or Firm* — Joseph Kolodka

(57) ABSTRACT

A system for centralized automatic bias control for a plurality of modulators, including a coupler for coupling output of each of the plurality of modulators to generate a combined modulator output. A pilot insertion device inserts a pilot tone into each of the plurality of modulators such that a different pilot tone frequency is inserted for each of the plurality of modulators. A monitoring device iteratively monitoring power ($P_t$) of each inserted pilot tone over time to determine whether a current modulator bias is optimal for each of the plurality of modulators, and an adjuster device iteratively adjusts the modulator bias for each of the plurality of modulators for which the current modulator bias is determined to be sub-optimal until a threshold condition has been met.

20 Claims, 7 Drawing Sheets

(51) Int. Cl.
*G02F 1/01* (2006.01)
*H04B 10/564* (2013.01)

(58) Field of Classification Search
USPC .......................................................... 398/16
See application file for complete search history.

(56) References Cited

U.S. PATENT DOCUMENTS

2005/0084202 A1* 4/2005 Smith .................... B82Y 20/00
385/14
2006/0034616 A1* 2/2006 Tipper .................. G02F 1/0123
398/186
2009/0232518 A1* 9/2009 Caton ................ H04B 10/5051
398/193

OTHER PUBLICATIONS

Sotoodeh, et al., "Modulator Bias and Optical Power Control of Optical Complex E-Field Modulators", Journal of Lightwave Technology, vol. 29, No. 15, pp. 2235-2248, Aug. 2011.
Yoshida, et al., "A Study on Automatic Bias Control for Arbitrary Optical Signal Generation by Dual-parallel Mach-Zehnder Modulator", ECOC 2010, 3 pages, Sep. 2010.

* cited by examiner

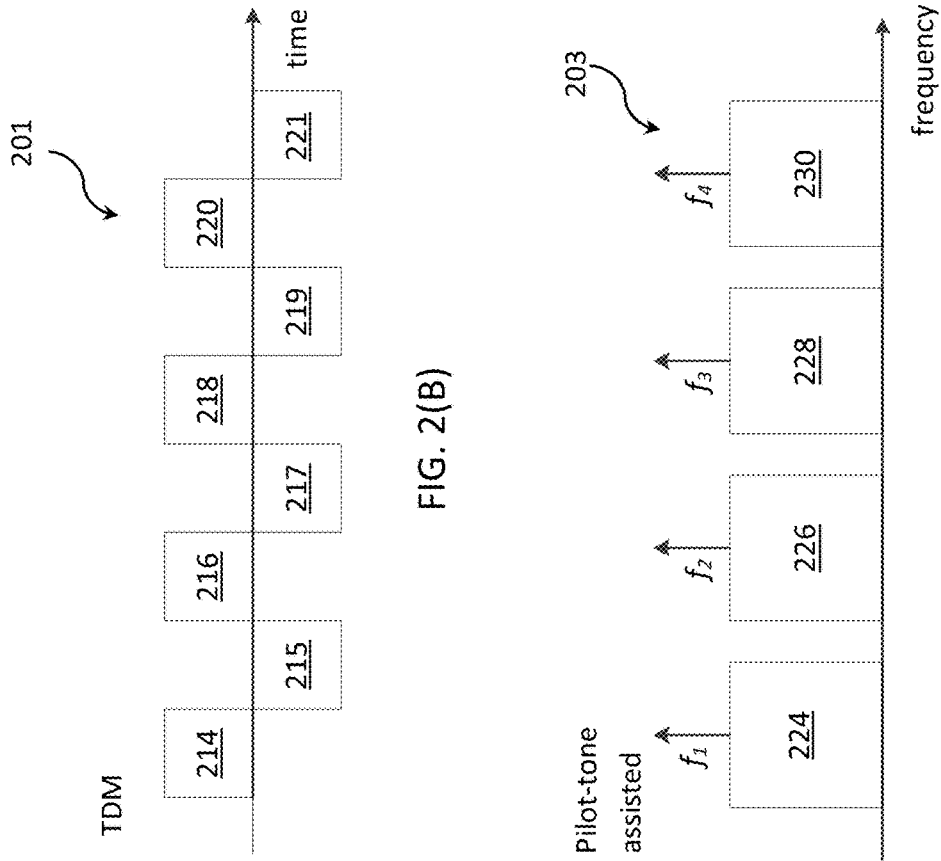
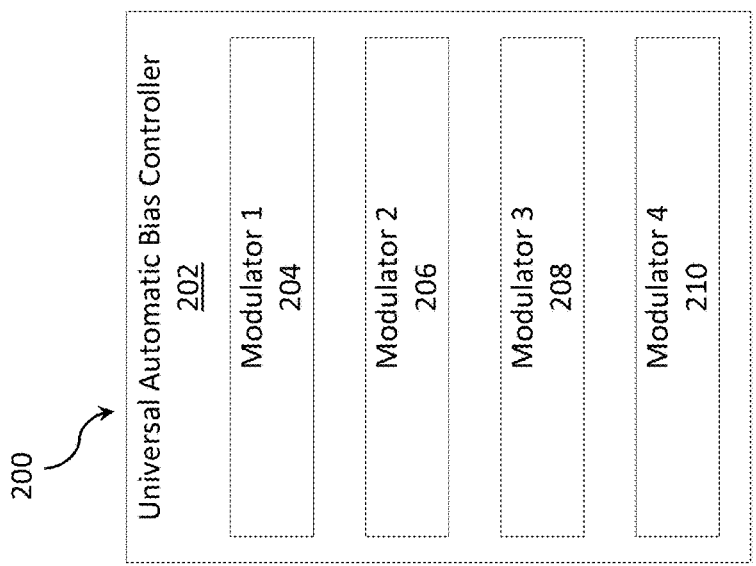

US 9,729,230 B2

CENTRALIZED AUTOMATIC BIAS CONTROL SYSTEM AND METHOD FOR MULTIPLE OPTICAL MODULATORS

RELATED APPLICATION INFORMATION

This application claims priority to provisional application No. 62/028,852 filed Jul. 25, 2014, the contents of which are incorporated herein by reference.

BACKGROUND OF THE INVENTION

Technical Field

The present invention relates generally to bias control for optical modulators, and more particularly, to centralized automatic bias control for multiple optical modulators.

Description of the Related Art

Optical modulators made from, for example, Lithium Niobate ($LiNbO_3$) play an important role in optical communication by performing electrical-optical conversions. Optical modulators are currently capable of transferring electrical binary data to the phase and intensity of optical fields, thereby enabling cost-effective long-haul transmission. However, optical modulators suffer from temperature sensitivity, and biases of optical modulators are susceptible to temperature fluctuation due to, for example, room temperature and driver heating.

It is desirable to have an automatic bias controller (ABC) circuit to control the optical modulator automatically to achieve the best signal quality. Even though ABC systems and methods have been implemented to adjust the bias effectively, those systems and methods can only be applied to a single modulator, as there is currently no systems or methods which work in systems including multiple modulators. The use of multiple modulators is quite prevalent in future 400 G and beyond optical systems where, for example, multiple carriers/modulators are employed to produce multiple sub-channels from one transponder. Conventional systems are only capable of employing a dedicated ABC circuit for controlling a single modulator. However, the advance of 400 G and beyond transmission employs multiple modulators to produce multiple carriers, and there are currently no systems capable of centrally controlling multiple modulators using a same hardware platform to stabilize all modulators in one transponder.

BRIEF SUMMARY OF THE INVENTION

A computer implemented method for centralized automatic bias control for a plurality of modulators, including coupling, using a coupler, output of each of the plurality of modulators to generate a combined modulator output. A pilot insertion device inserts a pilot tone into each of the plurality of modulators, wherein a different pilot tone frequency is inserted for each of the plurality of modulators. A monitoring device monitors power ($P_t$) of each inserted pilot tone over time to determine whether a current modulator bias is optimal for each of the plurality of modulators, an adjuster device adjusts the modulator bias for each of the plurality of modulators for which the current modulator bias is determined to be sub-optimal, and the monitoring and adjusting are iterated until a threshold condition has been met.

A system for centralized automatic bias control for a plurality of modulators, including a coupler for coupling output of each of the plurality of modulators to generate a combined modulator output. A pilot insertion device inserts a pilot tone into each of the plurality of modulators such that a different pilot tone frequency is inserted for each of the plurality of modulators. A monitoring device iteratively monitoring power ($P_t$) of each inserted pilot tone over time to determine whether a current modulator bias is optimal for each of the plurality of modulators, and an adjuster device iteratively adjusts the modulator bias for each of the plurality of modulators for which the current modulator bias is determined to be sub-optimal until a threshold condition has been met.

A computer readable storage medium comprising a computer readable program, wherein the computer readable program when executed on a computer causes the computer to perform the steps of coupling, using a coupler, output of each of the plurality of modulators to generate a combined modulator output, and inserting, using a pilot insertion device, a pilot tone into each of the plurality of modulators, wherein a different pilot tone frequency is inserted for each of the plurality of modulators. A monitoring device monitors power ($P_t$) of each inserted pilot tone over time to determine whether a current modulator bias is optimal for each of the plurality of modulators, an adjuster device adjusts the modulator bias for each of the plurality of modulators for which the current modulator bias is determined to be sub-optimal, and the monitoring and adjusting are iterated until a threshold condition has been met.

These and other advantages of the invention will be apparent to those of ordinary skill in the art by reference to the following detailed description and the accompanying drawings.

BRIEF DESCRIPTION OF THE DRAWINGS

FIG. 2A shows a diagram of a single universal Automatic Bias Controller (ABC) circuit, in accordance with an embodiment of the present principles;

FIG. 2B shows an exemplary graph of time-domain multiplexing using a universal Automatic Bias Controller (ABC) circuit, in accordance with an embodiment of the present principles;

FIG. 2C shows an exemplary graph of a pilot-tone assisted universal Automatic Bias Controller (ABC) circuit, in accordance with an embodiment of the present principles;

DETAILED DESCRIPTION

Figure 1:
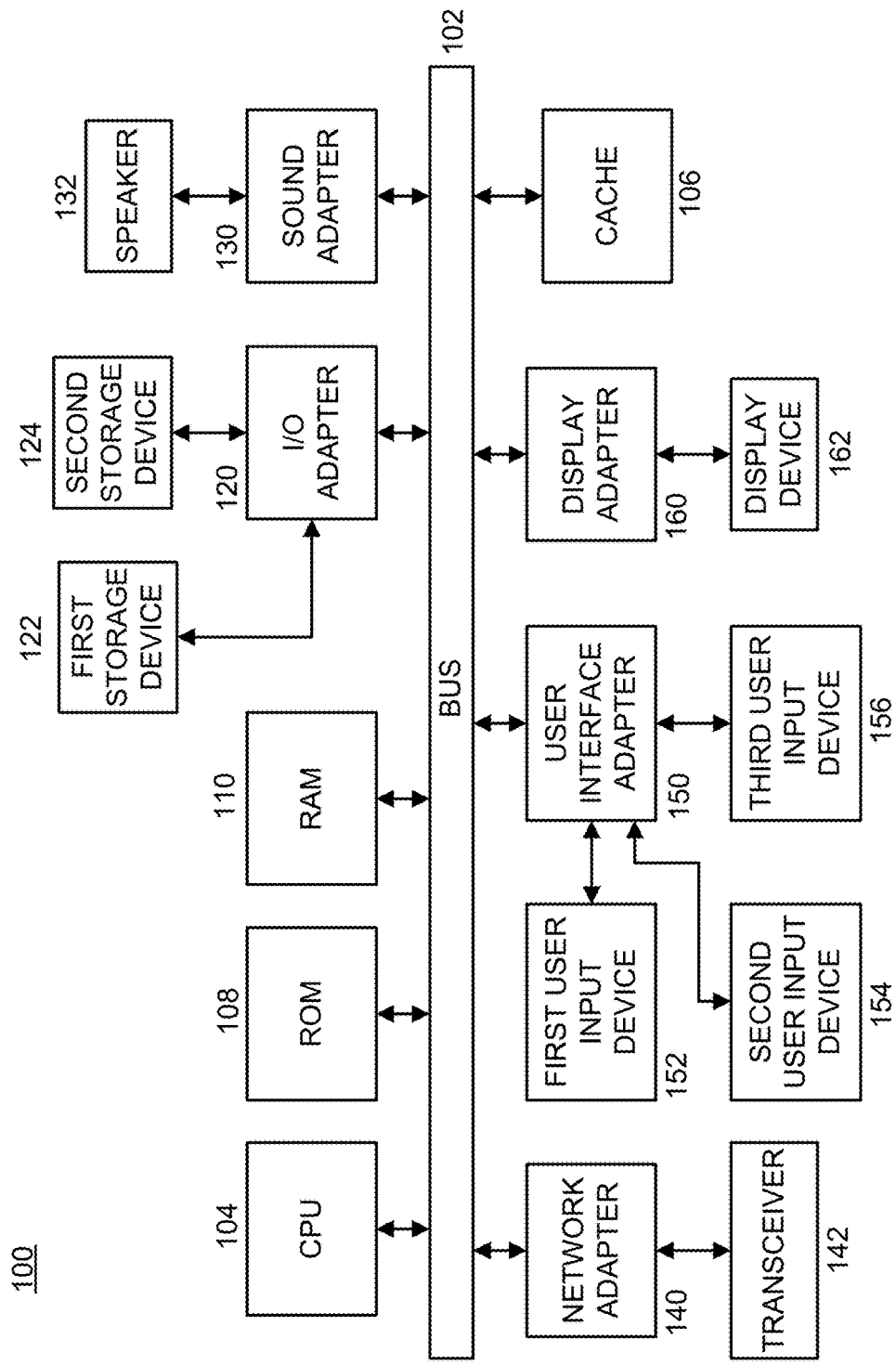
FIG. 1 shows an exemplary processing system to which the present principles may be applied, in accordance with an embodiment of the present principles

The present invention is directed to optimizing performance of communication systems by employing centralized automatic bias control that is capable of controlling multiple modulators using a same hardware platform to stabilize all modulators in one transponder. In one embodiment according to the present principles, time may be divided into multiple slots (e.g., time-division multiplexing (TDM)) corresponding to the number of modulators, and each time slot may be synchronized with bias dithering signals to differentiate each modulator.

In a preferred embodiment, rather than differentiating the modulator in the time domain, pilots may be inserted into each modulator so that a detected power spectrum may be employed to determine which modulator(s) is (are) not biased at an optimum state. This embodiment may employ a similar hardware configuration as used for conventional systems (e.g., for use with a single modulator), thus providing a cost-effective solution which does not require replacing all system hardware. Various embodiments of the present principles provide cost-effective solutions to control the bias of multiple modulators at the same time, thus enabling a compact hardware configuration. Furthermore, an embodiment including inserting pilot tones into each modulator is capable of differentiating the modulators from the pilot tones, and may share a same hardware platform as a single-modulator bias controller, thereby reducing costs and hardware complexity.

It should be understood that embodiments described herein may be entirely hardware or may include both hardware and software elements, which includes but is not limited to firmware, resident software, microcode, etc. In a preferred embodiment, the present invention is implemented in hardware.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, an exemplary processing system 100, to which the present principles may be applied, is illustratively depicted in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that circuits/systems 200, 300, 400, and 700 described below with respect to FIGS. 2A, 3, 4, and 7 are circuits/systems for implementing respective embodiments of the present principles. Part or all of processing system 100 may be implemented in one or more of the elements of systems 200, 300, 400, and 700 with respect to FIGS. 2A, 3, 4, and 7.

Figure 6:
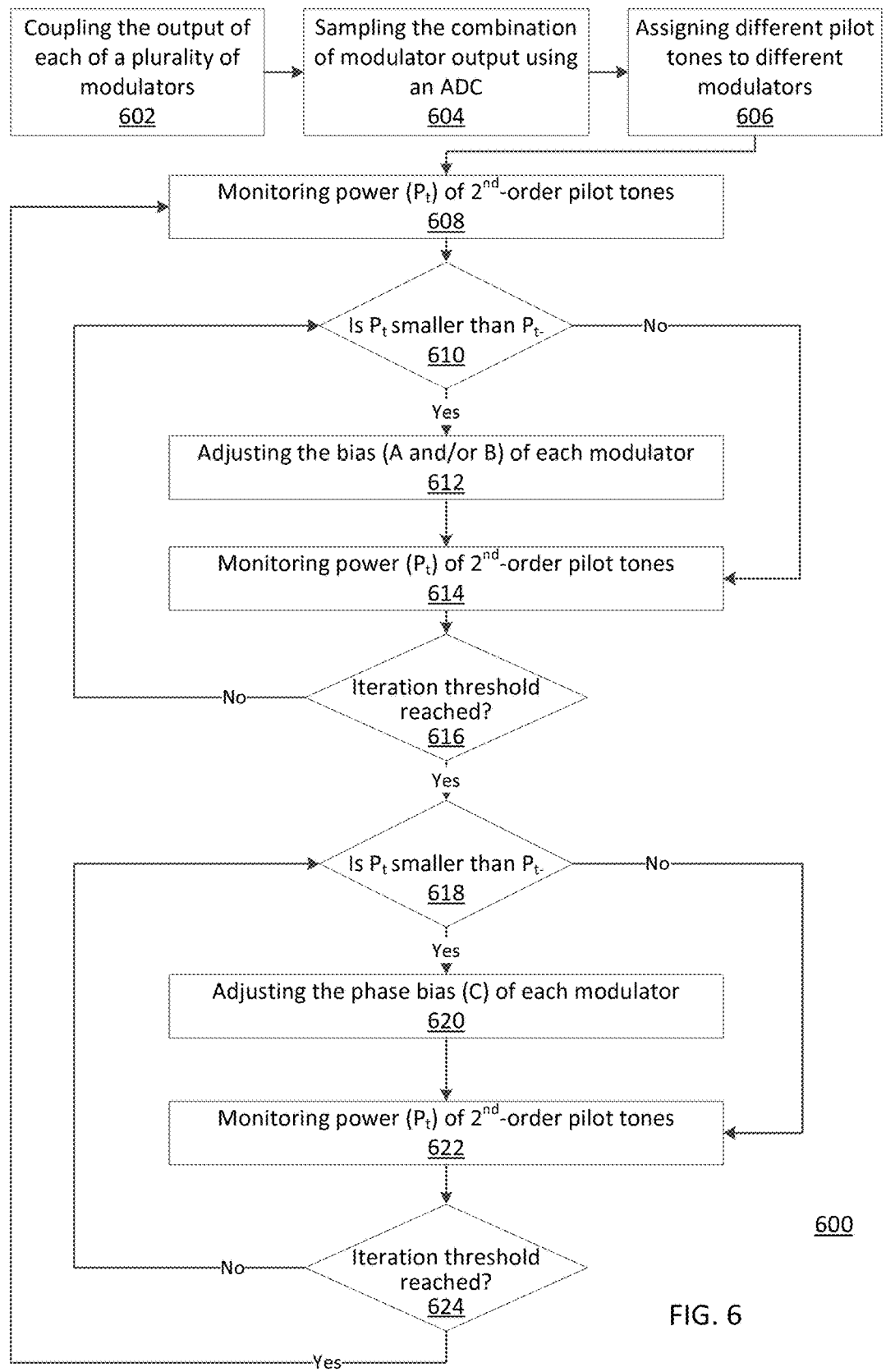
FIG. 6 shows an exemplary method for pilot-assisted centralized automatic bias control, in accordance with an embodiment of the present principles.

Further, it is to be appreciated that processing system 100 may perform at least part of the method described herein including, for example, at least part of method 600 of FIG. 6. Similarly, part or all of circuits/systems 200, 300, 400, and 700 of FIGS. 2A, 3, 4, and 7 may be used to perform at least part of method 600 of FIG. 6.

Referring now to FIG. 2A, a diagram of a single universal Automatic Bias Control (ABC) circuit 200 is illustratively depicted in accordance with an embodiment of the present principles. In one embodiment, one or more modulators 204, 206, 208, 210 may be controlled by a single universal automatic bias controller (ABC) 202 within a single transponder. For example, in an illustrative embodiment, 400 G signals may be obtained by multiplexing four 100 G Quadrature Phase Shift Keying (QPSK) signals, but it is contemplated that any amount and/or type of signals may be employed according to the present principles.

Referring now to FIG. 2B, with continued reference to FIG. 2A, an exemplary high-level graph 201 representing a universal Automatic Bias Controller (ABC) circuit using time-domain multiplexing is illustratively depicted in accordance with an embodiment of the present principles. In some embodiments, dithering signals may be employed, and may be generated by frequency modulation of a laser using the modulators 204, 206, 208, 210.

In an embodiment, to control biases in a signal (e.g., bias A (e.g., bias of an in-phase arm, bias B (e.g., bias of a quadrature arm), and/or phase bias C) for each modulator 204, 206, 208, 210, a simple time-division multiplexing (TDM) method may be employed which dedicates one time slot for each modulator, as shown in the TDM graph 201. In this example, the output of Modulator 204 is represented by blocks 214 and 215, the output of Modulator 206 is represented by blocks 216 and 217, the output of Modulator 208 is represented by blocks 218 and 219, and the output of Modulator 210 is represented by blocks 220 and 221, and are described in further detail below with reference to FIG. 3.

Referring now to FIG. 2C, with continued reference to FIG. 2A, an exemplary high-level graph 203 of a pilot-tone assisted universal Automatic Bias Controller (ABC) circuit is illustratively depicted according to an embodiment of the present principles. In an embodiment, to control biases in a signal (e.g., bias A, B, and/or phase bias C) for each modulator 204, 206, 208, 210, a pilot-tone assisted system/method may be employed according to the present principles. In this example, the output of Modulator 204 is represented by block 224 with pilot frequency $f_1$, the output of Modulator 206 is represented by block 226 with pilot frequency $f_2$, the output of Modulator 208 is represented by block 228 with pilot frequency $f_3$, and the output of Modulator 210 is represented by block 230 with pilot frequency $f_4$. The pilot frequencies $f_1$, $f_2$, $f_3$, and $f_4$ may be different for each modulator in some embodiments. In some embodiments, 2nd-order pilot tones may be, for example, $2f_1$, $2f_2$, $2f_3$, etc.) The pilot-tone assisted universal ABC system and method is described in further detail below with reference to FIG. 4.

Figure 3:
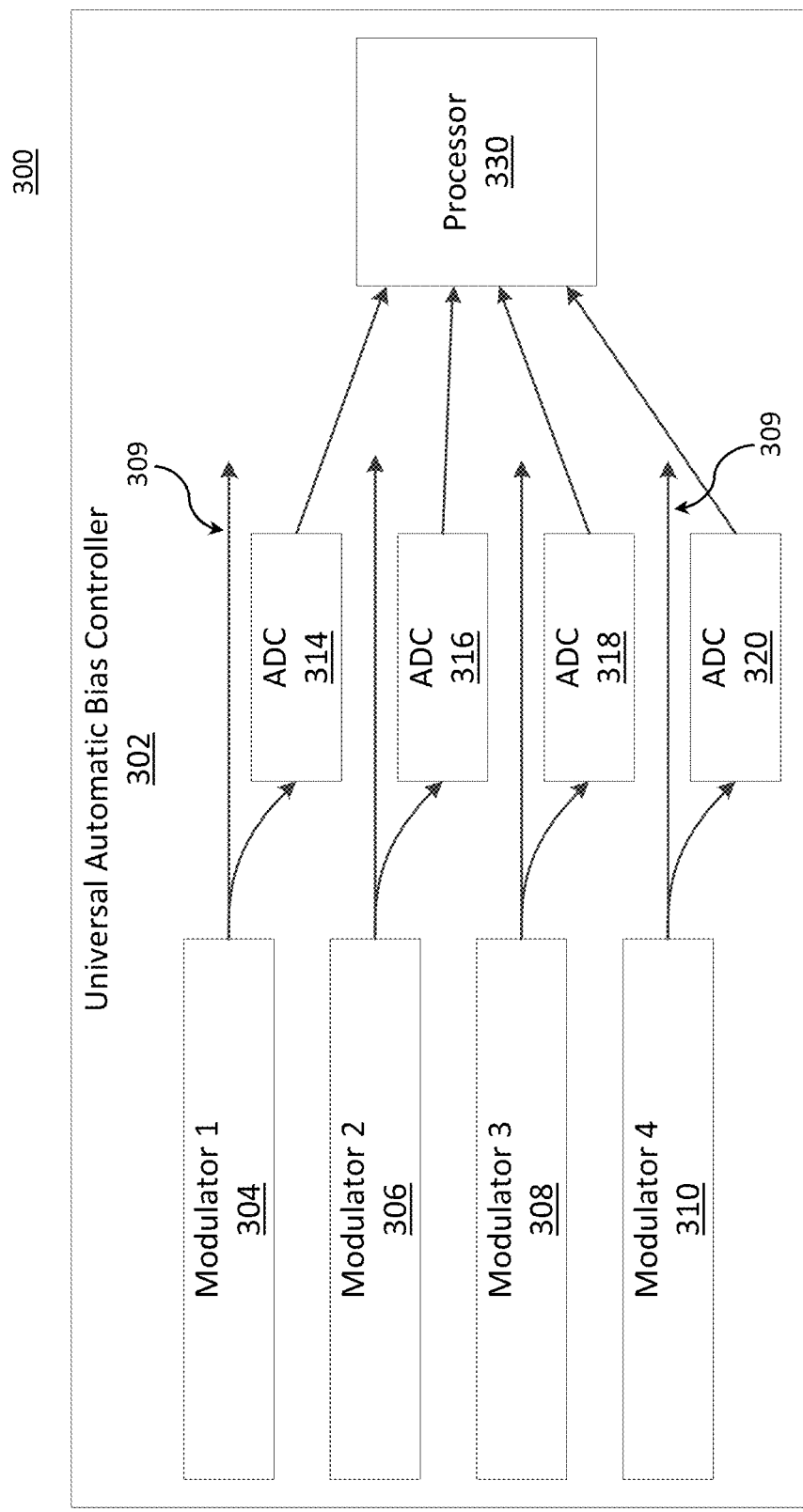
FIG. 3 shows an exemplary system for centralized automatic bias control for Time-Domain Multiplexing (TDM) based configurations, in accordance with an embodiment of the present principles.

Referring now to FIG. 3, an exemplary system 300 for centralized automatic bias control for Time-Division Multiplexing (TDM) based configurations is illustratively depicted in accordance with an embodiment of the present principles. In one embodiment, a universal ABC 302 may be employed to control the biases in a signal (e.g., bias A, bias B, and/or phase bias C) for each modulator 304, 306, 308, 310 using a simple time-division multiplexing (TDM) method which may dedicate one time slot for each modulator.

In an embodiment, different Analog to Digital Converters (ADCs) 314, 316, 318, 320 may be employed to monitor the output power of each of the modulators 304, 306, 308, and 310, respectively, and 309 may represent a transmission medium for any type of transmission. The ABC 302, the modulators 304, 306, 308, and 310, and the ADCs 314, 316, 318, and 320 may be controlled using one or more processors (e.g., micro-processors) 330 according to the present principles. In one embodiment, to determine optimum biases, biases may be adjusted based on power measurements (e.g., $p_1$, $p_2$) for two or more previous time slots (e.g., $t_1$, $t_2$). If the power (e.g., $p_2$) of a pilot tone (e.g., $2^{nd}$ order pilot tone (e.g., $2f_1$, $2f_2$, etc.) decreases as compared to a previously measured power (e.g., $p_1$), then the bias is not optimum, and further bias adjustment may be performed according to the present principles.

A disadvantage of this embodiment is that in this particular example using four modulators, four dedicated ADCs are employed to monitor the output power of each modulator, and as such, the single ABC system/method may need to run four times faster than in the case of a single-modulator to achieve the same tracking speed. It is noted that although four modulators are illustratively depicted in accordance with an embodiment, any number of modulators may be employed within the universal ABC according to the present principles.

Figure 4:
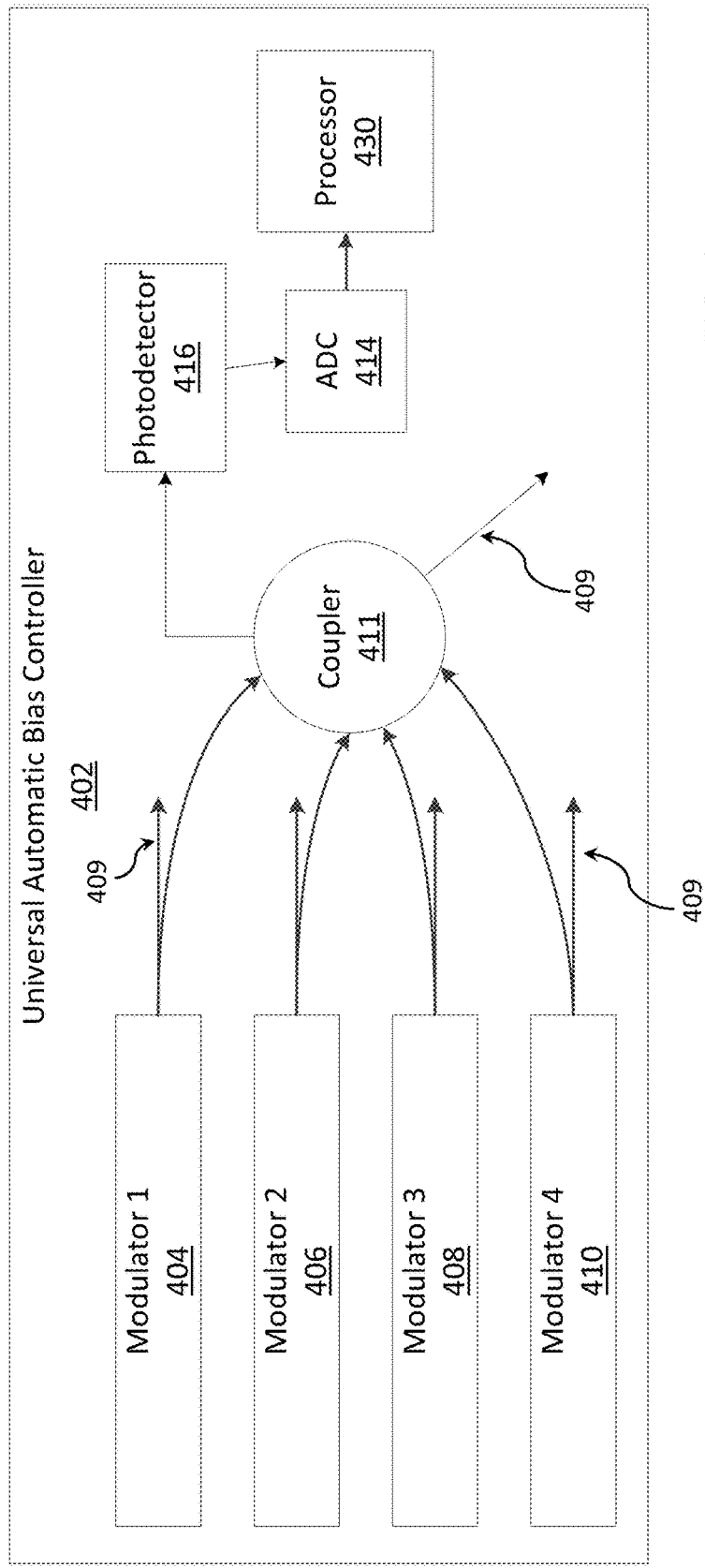
FIG. 4 shows an exemplary system for centralized automatic bias control for pilot-assisted configurations, in accordance with an embodiment of the present principles.

Referring now to FIG. 4, an exemplary system 400 for centralized automatic bias control for pilot-assisted configurations using a single, universal ABC 402 is illustratively depicted in accordance with an embodiment of the present principles. In an embodiment, the output of each of two or more modulators (e.g., 4 modulators) 404, 406, 408, 410 may be coupled by a coupler (e.g., optical coupler), may be detected using a photodetector 416, and may be sampled using, for example, a single Analog to Digital Converter (ADC) according to the present principles. In various embodiments, the paths 409 may represent any of a plurality of transmission mediums for any type of transmissions. The ABC 402, the modulators 404, 406, 408, and 410, the coupler 411, the photodiode 416, and the ADC 414 may be controlled using one or more processors (e.g., micro-processors) 430 according to the present principles In one embodiment, as the output may be a combination of a plurality of modulators, the present principles may be employed to differentiate which modulators have an optimum bias and which modulators do not have an optimum bias once they have reached a stable state. For example, an optimum bias may be determined based on the power measured for each peak, and an optimum bias point may be reached when the measured peak power increases when adjusting the bias. In an embodiment, this ambiguity (e.g., differentiation between different peaks) may be resolved by employing different pilot frequencies for each different modulator according to the present principles. The peak of each pilot in an optical spectrum may automatically indicate which modulator(s) do not have an optimum bias (e.g., by the location of the peak frequency of the modulators), and thus, which modulator(s) may be adjusted to improve the bias for particular modulators. For simplicity of illustration, a system 400 including four modulators is illustratively depicted, although any number of modulators may be employed according to the present principles.

Figure 5:
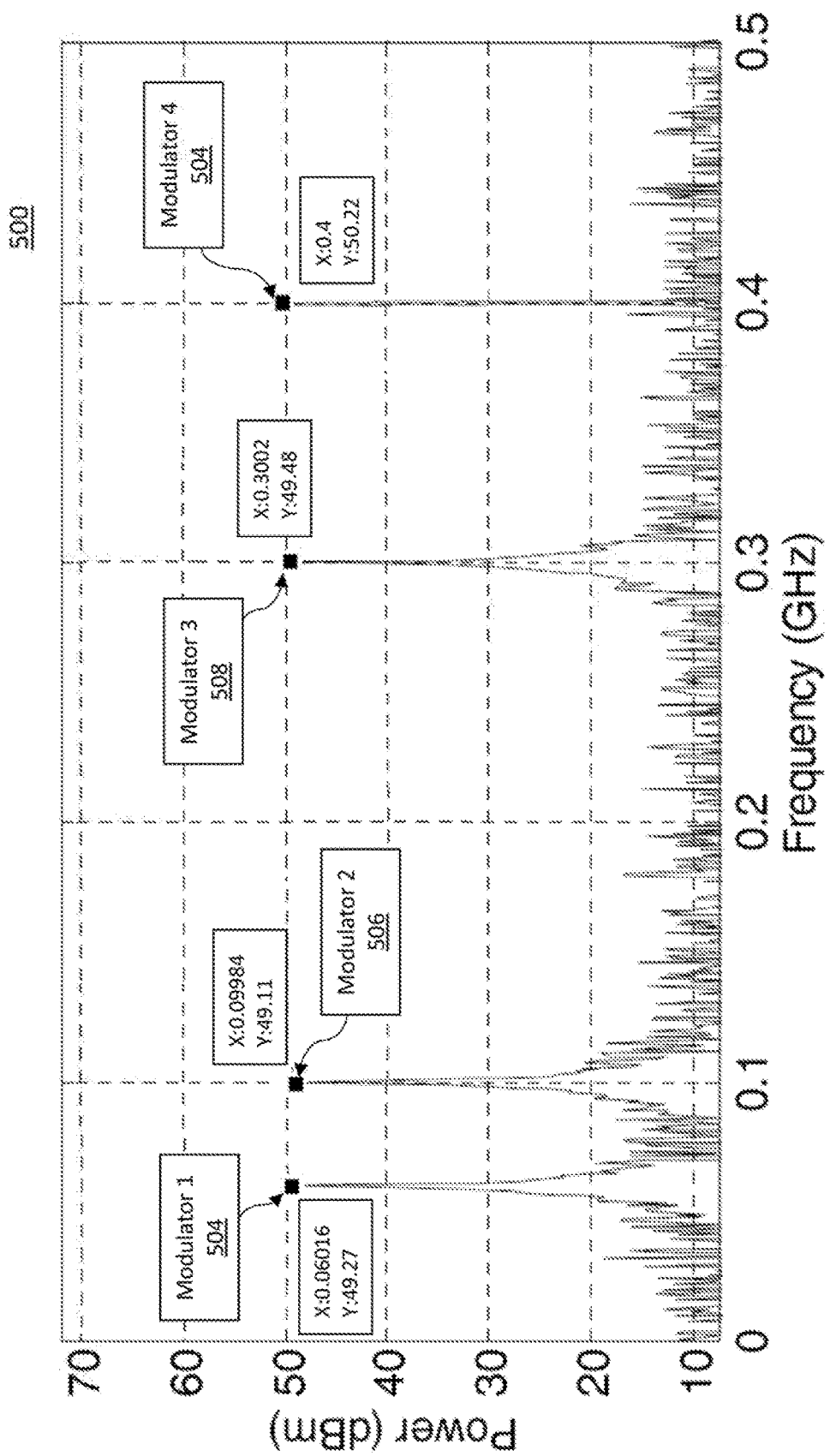
FIG. 5 shows an exemplary graph of a detected power spectrum in a photodiode, in accordance with an embodiment of the present principles.

Referring now to FIG. 5, with continued reference to FIG. 4, an exemplary graph 500 of a detected power spectrum in a photodiode is shown. The graph 500 is a close up power spectrum within DC-500 MHz at non-optimum biases (e.g., bias A, bias B, and/or phase bias C) for four modulators 504, 506, 508, and 510, and is shown for simplicity of illustration, although the system 400 is capable of being employed with any types of spectrums and/or number of modulators according to various embodiments of the present principles.

In an illustrative embodiment, a pilot frequency for Modulators 1-4 (404, 406, 408, and 410) may be set to, for example, 30 MHz, 50 MHz, 150 MHz, and 200 MHz, respectively. Due to the nonlinearity of the modulators, the pilot tones may produce and output their $2^{nd}$-order images (e.g., pilot tones) in some embodiments. There are four peak tones corresponding to the four modulators 404, 406, 408, and 410, and the peaks may represent how effective the bias is at particular locations based on the position of the bias. The signal quality may depend on the position of the bias (e.g., as the bias moves closer to an optimal bias, the corresponding signal quality improves) in some embodiments. In this example, the frequencies shown may represent the $2^{nd}$-order of each of the pilot tones that were inserted into each modulator.

In an embodiment, the present principles may be applied to situations in which phase bias is present. For example, if a phase bias C is optimal (e.g., $\pi/2$), and biases A and B are null points, a "beating term" may exist between in-phase and quadrature components (e.g., I and Q signals) of a pilot tone, and this beating term condition may be represented as follows:

$$I_{out} \propto [I(t)+\cos(\omega_{p1}t)][Q(t)+\sin(\omega_{p1}t)]\cos(\phi)=[I(t)Q(t)+Q(t)\cos(\omega_{p1}t)+I(t)\sin(\omega_{p1}t)+\sin(2\omega_{p1}t)]\cos(\phi),$$

where $I_{out}$ represents a photocurrent from a photodetector, I(t) represents an in-phase signal arm, Q(t) represents a quadrature phase arm, and ($\omega_{p1}t$) represents a pilot signal. As is evident from the above method, if the phase bias is $\pi/2$, there may exist a beating term to cause the $2^{nd}$-order tones (e.g., $\sin(2\omega_{p1}t)$ in the above example). In some embodiments, $2^{nd}$-order pilot tones may still exist even when biases A and B are at their optimum states. For example, as shown in the above example, even if In-phase (bias A)/Quadrature (bias B) are at an optimum bias, the last term (e.g., $\sin(2\omega_{p1}t)$) may still exist if the phase bias C is not optimum (e.g., $\phi \neq \pi/2$). In an embodiment, biases may be considered optimum when a current power measurement at a current time is larger than the previous power measurement at a previous time according to the present principles.

Referring now to FIG. 6, an exemplary method 600 for pilot-assisted centralized automatic bias control is illustratively depicted in accordance with an embodiment of the present principles. In one embodiment, in block 602, the outputs of each of a plurality of modulators may be coupled using a coupler (e.g., optical coupler), and the combination of the outputs may be sampled using a single analog-to-digital converter (ADC) in block 604. In block 606, depending on the number of modulators, a plurality of pilot tones may be selected and assigned to each different modulator (e.g., manually or automatically) such that the frequency of $2^{nd}$-order pilot tones are not the same as the frequency of the assigned pilot tones. In one embodiment, each of the pilot tone frequencies selected and assigned for each modulator are different from the frequencies of the pilot tones assigned to all other modulators in the plurality of modulators. The assigning of different pilot tones to each of the modulators within a single ABC circuit may effectively separate the modulators so that optimum bias states may be determined and adjusted for each of the modulators within the single ABC circuit according to the present principles.

In an embodiment, in block 608, the power p may be monitored and/or measured at a particular time t (e.g., $p_t$) using a monitoring device. If a modulator has an optimum bias, non-linearity may be present, and biases may be adjusted using an adjuster to detect $2^{nd}$-order pilot tones (e.g., based on minimizing of $2^{nd}$-order pilot tones) according to various embodiments of the present principles. In block 610, if the current power measurement $p_t$ is determined to be smaller than the previous power measurement $p_{t-}$ (e.g., if the power of the $2^{nd}$-order pilot tone decreases in comparison to a previously measured power of the $2^{nd}$-order pilot tone), then the modulator bias (e.g., bias A, bias B, and/or phase bias C) is not optimal. An optimum bias may be determined by monitoring and/or measuring power in block 614 to determine whether the power $p_t$ is increasing in comparison a previous power measurement $p_{t-}$. If the power $p_t$ is increasing, then the bias is at, or nearly at, an optimum bias. If there is no record stored for a previous power measurement ($p_{t-}$) (e.g., if the current measurement is the first measurement taken), then the power ($p_t$) of $2^{nd}$-order pilot tones may continue to be monitored in block 614 to obtain additional power measurements.

In an embodiment, the modulator bias (e.g., bias A, bias B, and/or phase bias C) may be adjusted for each modulator in the ABC (e.g., depending on the previous adjustments) in block 612, and the power ($p_t$) of $2^{nd}$-order pilot tones may continue to be monitored in block 614. The adjustment of the A and/or B biases may be iterated until a threshold condition (e.g., optimum bias, number of iterations, etc.) is determined to have been reached in block 616. In an embodiment, the threshold number of iterations may be predetermined (e.g., 10 iterations), and may include, for example alternatively adjusting the A and B bias, adjusting the A bias for the first five adjustments and adjusting the B bias for the next five adjustments, etc. In an embodiment, the steps of determining whether a current power measurement is smaller than a previous power measurement 610, adjusting the A and/or B bias 612, and monitoring the power of the $2^{nd}$-order pilot tones 614 may be iterated until a threshold condition is determined to be reached in block 616.

In an embodiment, if an iteration threshold has been reached in block 616, a current power measurement $p_t$ of $2^{nd}$-order pilot tones may be compared to a previous power measurement $p_{t-}$ of $2^{nd}$-order pilot tones for modulators including phase C biases using an evaluator device in block 618. If the current power measurement $p_t$ is determined to be smaller than the previous power measurement $p_{t-}$, the modulator bias (e.g., phase bias C) may then be adjusted for each modulator in the ABC (e.g., depending on the previous adjustments) in block 620, and the power ($p_t$) of $2^{nd}$-order pilot tones may continue to be monitored in block 622.

If the current power measurement $p_t$ is determined to be larger than the previous power measurement $p_{t-}$, then the bias is at, or nearly at, an optimum, and thus the step of adjusting of phase bias C in block 620 may be omitted, and the power ($p_t$) of $2^{nd}$-order pilot tones may continue to be monitored in block 622. The adjustment of the phase bias C may be iterated until a threshold condition (e.g., optimum bias, number of iterations, etc.) is determined to have been reached in block 624. In an embodiment, the steps of determining whether a current power measurement is smaller than a previous power measurement 618, adjusting the phase bias C 620, and monitoring the power of the $2^{nd}$-order pilot tones 622 may be iterated until a threshold condition (e.g., optimum phase bias C, number of iterations, etc.) is determined to have been reached in block 624. For example, in an illustrative embodiment, if there is a current power $p_1$ at bias $A_1$, and a previous power $p_0$ at bias $A_0$, assuming for this example that $A_1 > A_0$. If $p_1 < p_0$, the power of $2^{nd}$-order pilot tones is not optimum at bias $A_0$, and the bias may be iteratively increased (e.g., from $A_1$ to $A_2$). If $p_2$ is measured to be larger than $p_1$, then the power $p_1$ is the minimum at this time, and the bias A may be optimum. In some embodiments, a similar procedure may be performed for the Quadrature bias (bias B) and/or the phase bias C according to the present principles.

In an embodiment, after the iteration threshold has been determined to have been reached in block 624, the method 600 may effectively restart, and may again be applied to the same modulators (or newly added modulators) to monitor and continuously improve performance. This may include iterating the steps of monitoring the power of the $2^{nd}$-order pilot tones (608, 614, 624), determining whether a current power measurement is smaller than a previous power measurement (610, 618), and adjusting the modulator biases (e.g., A bias, B bias, phase bias C) for each modulator in the ABC circuit (612, 620) according to the present principles. In one embodiment, adjustments may be made for each type of bias (e.g., bias A) until a threshold condition is met before adjusting a next type of bias (e.g., bias B, phase bias C).

Figure 7:
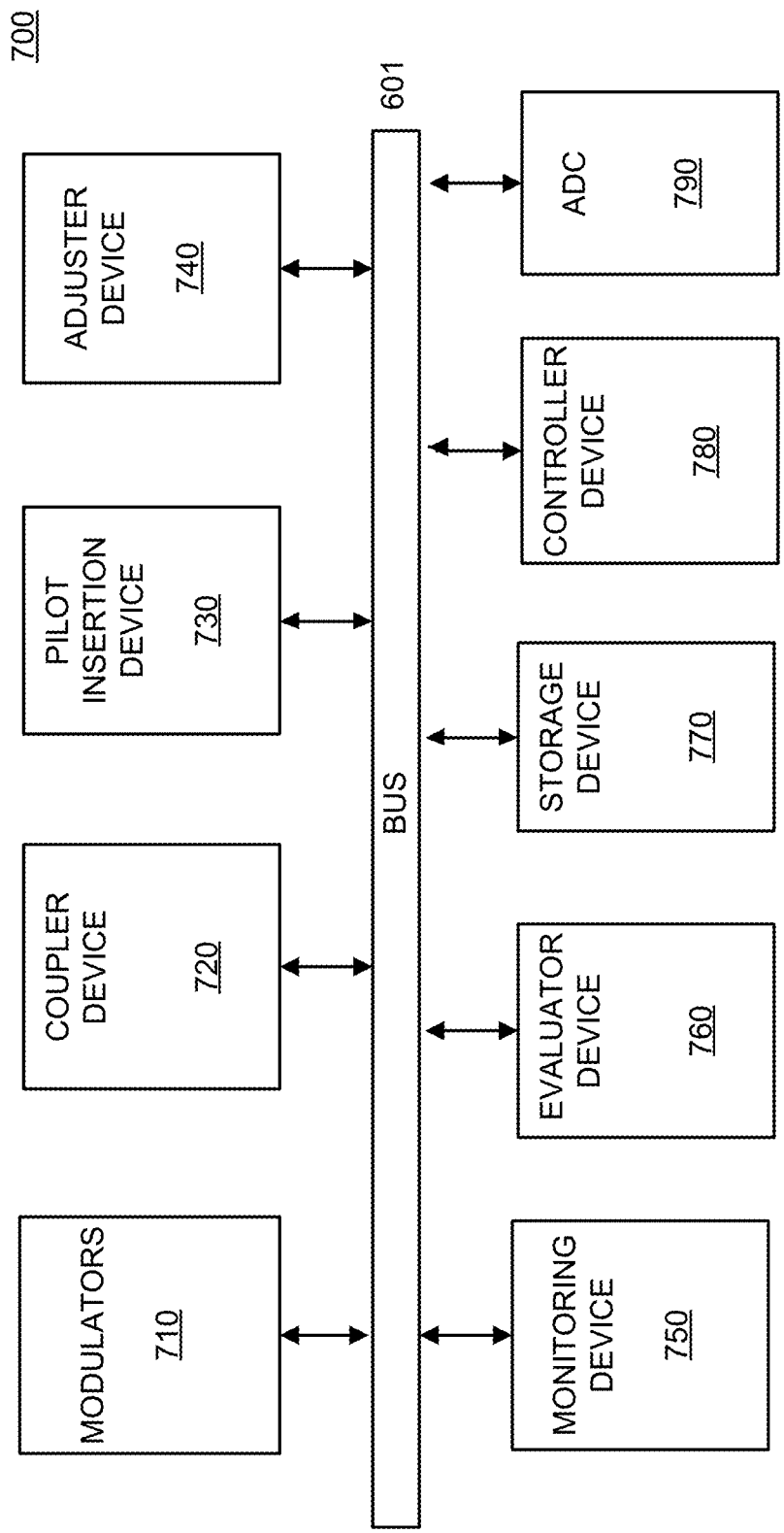
FIG. 7 shows an exemplary system for pilot-assisted centralized automatic bias control, in accordance with an embodiment of the present principles.

Referring now to FIG. 7, an exemplary system 700 for pilot-assisted centralized automatic bias control is illustratively depicted in accordance with an embodiment of the present principles. While many aspects of system 700 are described in singular form for the sakes of illustration and clarity, the same can be applied to multiples ones of the items mentioned with respect to the description of system 700. For example, while an inserted pilot signal is mentioned with respect to the pilot insertion device 710, more than one pilot signal may be used in accordance with the teachings of the present principles, while maintaining the spirit of the present principles. Moreover, it is appreciated that the inserted pilot signal is but one aspect involved with system 700 than can be extended to plural form while maintaining the spirit of the present principles.

The system 700 can include one or more modulators 710, one or more coupler devices 720, one or more pilot tone insertion devices 730, one or more adjuster devices 740, one or more monitoring devices 750, one or more evaluator devices 760, one or more controller devices 780, and one or more analog-to-digital converters 790.

In one embodiment, a plurality of modulators (e.g., optical modulators) 710 may be controlled by a single controller device (e.g., single universal automatic bias controller (ABC)) 780. Output of each of the plurality of modulators 710 may be coupled using a coupling device (e.g., optical coupler) 720, and the output of the coupler 720 may be received by a photodetector (not shown), before being sampled by a single ADC 790.

In an embodiment, a pilot insertion device 730 may be employed to select and assign a plurality of pilot tones to each of the modulators 710 (e.g., manually or automatically) using a pilot insertion device 730, such that the frequency of $2^{nd}$-order pilot tones are not the same as the frequency of the assigned pilot tones. In one embodiment, each of the pilot tone frequencies selected and assigned for each modulator are different from the frequencies of the pilot tones assigned to all other modulators in the plurality of modulators. The assigning of different pilot tones to each of the modulators within a single ABC system 700 may effectively separate the modulators so that optimum bias states may be determined using an evaluator device 760, and adjusted using an adjuster device 740 for each of the modulators 710 within the single ABC system 700 according to the present principles.

A monitoring device 750 may be employed to monitor and/or measure the power p at a particular time t (e.g., $p_t$), and the measured power levels may be stored in a storage device 770. An evaluator device 760 may determine whether the current power measurement $p_t$ is smaller than the previous power measurement $p_{t-n}$ (e.g., if the power of the $2^{nd}$-order pilot tone decreases in comparison to a previously measured power of the $2^{nd}$-order pilot tone). If yes, then the modulator bias (e.g., A bias, B bias, phase bias C) is determined to be sub-optimal by the evaluator device 760. In an embodiment, the ABC 780 may centrally control the biases of multiple modulators based on the power of $2^{nd}$-order pilot tones using a single ADC 790 within a single transponder according to the present principles.

In an embodiment, an adjuster device 740 may adjust the modulator biases for each of the modulators 710, and a monitoring device 750 may continue to monitor and/or measure power until an evaluator device 760 determines that a threshold condition (e.g., optimum bias, number of iterations, etc.) has been met for a particular modulator bias (e.g., A bias). The system 700 may then similarly monitor, evaluate, and adjust a next modulator bias (e.g., B bias) until a next threshold condition has been met, and then may similarly monitor, evaluate, and adjust a next, different modulator bias (e.g., phase bias C) until a next threshold condition has been met according to one embodiment of the present principles. The controller 780 may then iterate one or more of the components of the system 700 according to various embodiments.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A computer implemented method for centralized automatic bias control for a plurality of modulators, comprising:
   coupling, using a coupler, output of each of the plurality of modulators to generate a combined modulator output;
   inserting, using a pilot insertion device, a pilot tone into each of the plurality of modulators: wherein a different pilot tone frequency is inserted for each of the plurality of modulators;
   monitoring, using a monitoring device, power ($P_t$) of each inserted pilot tone over time to determine whether a current modulator bias is optimal, based on a threshold condition, for each of the plurality of modulators;
   dividing, by time-division multiplexing, a period of time into a plurality of time slots corresponding to a total number of modulators, and differentiating each of the plurality of modulators by synchronization with bias dithering signals;
   adjusting, using an adjuster device, the current modulator bias determined to be sub-optimal for each of the plurality of modulators; and
   iterating the monitoring and adjusting until the threshold condition has been met.

2. The method of claim 1, further comprising:
   monitoring, using the monitoring device, power ($P_t$) of each inserted pilot tone over time to determine whether a second type of modulator bias is optimal for each of the plurality of modulators;
   adjusting, using the adjuster device, the second type of modulator bias determined to be sub-optimal for each of the plurality of modulators; and iterating the monitoring and adjusting until a threshold condition has been met for the second type of modulator bias.

3. The method of claim 1, further comprising:
monitoring, using the monitoring device, power ($P_t$) of each inserted pilot tone over time to determine whether a phase type modulator bias is optimal for each of the plurality of modulators;
adjusting: using the adjuster device, the phase type modulator bias determined to be sub-optimal for each of the plurality of modulators; and
iterating the monitoring and adjusting until a threshold condition has been met for the phase type modulator bias.

4. The method of claim 1, further comprising:
sampling the combined modulator output using a single analog-to-digital converter (ADC) for the plurality of modulators, the ADC being configured to differentiate the modulators from the pilot tones.

5. The method of claim 1, wherein the inserted pilot tones are $2^{nd}$-order pilot tones.

6. The method of claim 1, wherein the modulator bias is determined to be optimal if the power of the inserted pilot tone being monitored is larger than that of a previously measured power.

7. The method of claim 1, wherein the coupler is an optical coupler.

8. The method of claim 1, wherein the inserted pilot tones are $1^{st}$-order pilot tones, and are selected for each of the plurality of modulators such that frequencies of the inserted pilot tones are different from frequencies of generated $2^{nd}$-order pilot tones.

9. A system for centralized automatic bias control for a plurality of modulators, comprising:
a coupler for coupling a respective output of each of the plurality of modulators to generate a combined modulator output;
a pilot insertion device for inserting a pilot tone into each of the plurality of modulators, wherein a different pilot tone frequency is inserted for each of the plurality of modulators;
a monitoring device for iteratively monitoring power ($P_t$) of each inserted pilot tone over time to determine whether a current modulator bias is optimal for each of the plurality of modulators; and
an adjuster device for iteratively adjusting the current modulator bias determined to be sub-optimal for each of the plurality of modulators until a threshold condition has been met, the adjuster device being further configured to divide, by time-division multiplexing, a period of time into a plurality of time slots corresponding to a total number of modulators, and differentiating each of the plurality of modulators by synchronization with bias dithering signals.

10. The system of claim 9, wherein the monitoring device iteratively monitors power ($P_t$) of each inserted pilot tone over time to determine whether a second type of modulator bias is optimal for each of the plurality of modulators; and
wherein the adjuster device iteratively adjusts the second type of modulator bias determined to be sub-optimal for each of the plurality of modulators until a threshold condition has been met for the second type of modulator bias.

11. The system of claim 9, wherein the monitoring device iteratively monitors power ($P_t$) of each inserted pilot tone over time to determine whether a phase type modulator bias is optimal for each of the plurality of modulators; and wherein the adjuster device iteratively adjusts the phase type modulator bias determined to be sub-optimal for each of the plurality of modulators until a threshold condition has been met for the phase type modulator bias.

12. The system of claim 9, further comprising:
a single analog-to-digital converter (ADC) for sampling the combined modulator output for the plurality of modulators, the ADC being configured to differentiate the modulators from the pilot tones.

13. The system of claim 9, wherein the inserted pilot tones are $2^{nd}$-order pilot tones.

14. The system of claim 9, wherein the modulator bias is determined to be optimal if the power of the inserted pilot tone being monitored is larger than that of a previously measured power.

15. The system of claim 9, wherein the inserted pilot tones are $1^{st}$-order pilot tones, and are selected for each of the plurality of modulators such that frequencies of the inserted pilot tones are different from frequencies of generated $2^{nd}$-order pilot tones.

16. The system of claim 10, wherein the current modulator bias is an in-phase bias, and the second type of modulator bias is a quadrature bias.

17. A non-transitory computer-readable storage medium, coupled to a processor, comprising a computer readable program, wherein the computer readable program when executed on a computer by the processor causes the computer to perform the steps of:
coupling, using a coupler, output of each of the plurality of modulators to generate a combined modulator output;
inserting, using a pilot insertion device, a pilot tone into each of the plurality of modulators, wherein a different pilot tone frequency is inserted for each of the plurality of modulators;
monitoring, using a monitoring device, power ($P_t$) of each inserted pilot tone over time to determine whether a current modulator bias is optimal for each of the plurality of modulators;
dividing, by time-division multiplexing, a period of time into a plurality of time slots corresponding to a total number of modulators, and differentiating each of the plurality of modulators by synchronization with bias dithering signals
adjusting, using an adjuster device, the current modulator bias determined to be sub-optimal for each of the plurality of modulators; and
iterating the monitoring and adjusting until a threshold condition has been met.

18. The computer-readable storage medium of claim 17, further comprising:
monitoring, using the monitoring device, power ($P_t$) of each inserted pilot tone over time to determine whether a second type of modulator bias is optimal for each of the plurality of modulators;
adjusting, using the adjuster device, the second type of modulator bias determined to be sub-optimal for each of the plurality of modulators; and
iterating the monitoring and adjusting until a threshold condition has been met for the second type of modulator bias.

19. The computer-readable storage medium of claim 17, further comprising:

monitoring, using the monitoring device, power ($P_t$) of each inserted pilot tone over time to determine whether a phase type modulator bias is optimal for each of the plurality of modulators;

adjusting, using the adjuster device, the phase type modulator bias determined to be sub-optimal for each of the plurality of modulators; and iterating the monitoring and adjusting until a threshold condition has been met for the phase type modulator bias.

20. The computer-readable storage medium of claim 17, further comprising:

sampling the combined modulator output using a single analog-to-digital converter (ADC) for the plurality of modulators, the ADC being configured to differentiate the modulators from the pilot tones.

* * * * *